(12) United States Patent
Wu et al.

(10) Patent No.: US 7,675,595 B2
(45) Date of Patent: Mar. 9, 2010

(54) LIQUID CRYSTAL DISPLAY PANEL HAVING RECTANGULAR LIQUID CRYSTAL DOMAIN ARRANGING LAYERS INCLUDING CROSSED SLITS

(75) Inventors: Yi-Chun Wu, Hualien (TW);
Chien-Chang Lee, Tainan (TW);
Wen-Chun Wang, Taichung (TW);
Ming-Chang Yu, Taichung (TW)

(73) Assignee: Wintek Corporation, Taichung (TW)

( * ) Notice: Subject to any disclaimer, the term of this patent is extended or adjusted under 35 U.S.C. 154(b) by 116 days.

(21) Appl. No.: 11/976,981

(22) Filed: Oct. 30, 2007

(65) Prior Publication Data

US 2008/0111963 A1 May 15, 2008

(30) Foreign Application Priority Data

Nov. 13, 2006 (TW) .............................. 95141938 A (51) Int. Cl.
*G02F 1/1337* (2006.01)
*G02F 1/1343* (2006.01)

(52) U.S. Cl. ..................... 349/129; 349/130; 349/143
(58) Field of Classification Search .......... 349/129–131
See application file for complete search history.

(56) References Cited

U.S. PATENT DOCUMENTS

| 2005/0078255 | A1* | 4/2005 | Hiroshi ..................... 349/141 |
| 2006/0033853 | A1* | 2/2006 | Lee et al. .................... 349/42 |
| 2006/0221275 | A1* | 10/2006 | Matsufuji .................... 349/96 |

* cited by examiner

*Primary Examiner*—Andrew Schechter
*Assistant Examiner*—Michael Inadomi
(74) *Attorney, Agent, or Firm*—Bacon & Thomas, PLLC (57) ABSTRACT

A liquid crystal display panel (LCD) panel is provided. The LCD panel includes a plurality of pixels. Each pixel includes a pixel electrode layer and a plurality of liquid crystal domain arranging layers. The pixel electrode layer has a plurality of slits. The liquid crystal domain arranging layers are disposed near the pixel electrode layer. Each pixel is divided into a plurality of essentially closed liquid crystal domain fields by the arranging layers and the slits. Each liquid crystal domain field is formed by encircling at least one arranging layer and at least one slit.

11 Claims, 8 Drawing Sheets

LIQUID CRYSTAL DISPLAY PANEL HAVING RECTANGULAR LIQUID CRYSTAL DOMAIN ARRANGING LAYERS INCLUDING CROSSED SLITS

This application claims the benefit of Taiwan application Serial No. 095141938, filed Nov. 13, 2006, the subject matter of which is incorporated herein by reference.

BACKGROUND OF THE INVENTION

1. Field of the Invention

The invention relates in general to a liquid crystal display (LCD) panel, and more particularly to a multi-domain vertical alignment (MVA) LCD panel.

2. Description of the Related Art

Liquid crystal display (LCD) panels, having the features of lightweight, small size, high display quality and long lifespan, is now widely applied in electronic devices such as mobile phone, computer screen, notebook, flat TV and personal digital assistant (PDA). LCD panels have a range of view angle within which the viewer has best reception quality. Particularly in a flat TV, the LCD panel needs to have a wider range of view angle for providing the viewer with best reception quality. Therefore, achievement of a wider range of view angle has become an important technology to the LCD panel industry. A conventional LCD panel is exemplified below.

Figure 1A:
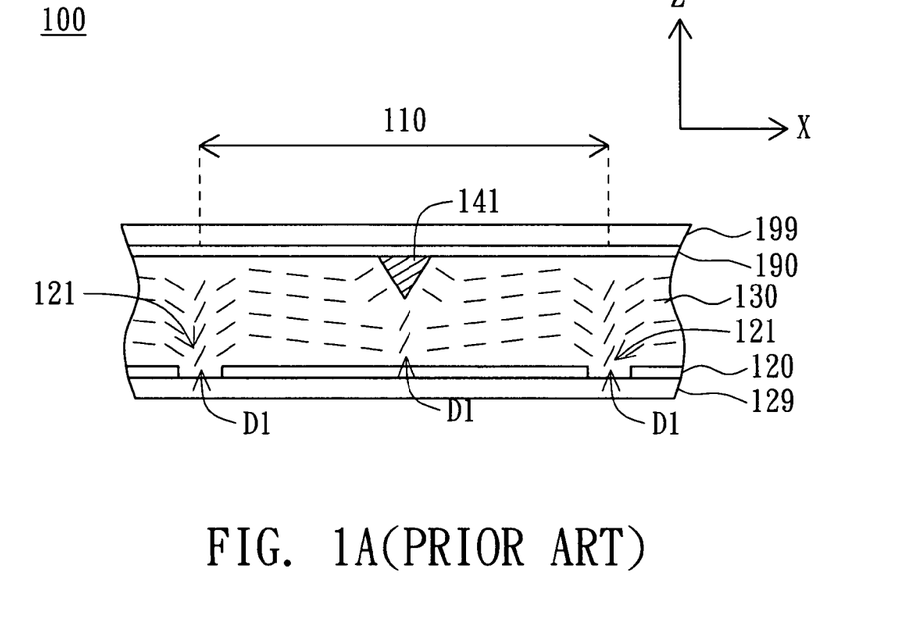
FIG. 1A (Prior Art) is an illustration of a conventional LCD panel.

Referring to FIG. 1A, an illustration of a conventional LCD panel is shown. The LCD panel 100 includes a substrate 199, a liquid crystal layer 130 and a substrate 129. The substrates 199 and 129 retain the liquid crystal layer 130 by the top surface and the bottom surface thereof. The substrate 199 includes a common electrode layer 190 and a bump 141. The substrate 129 includes a pixel electrode layer 120 having a slit 121. When voltage is applied, the liquid crystal molecules will be deflected on the bump 141 and become substantially vertical to the surface thereof. Meanwhile, the liquid crystal molecules generate different levels of deflection with respect to the surface of the LCD panel 100 to achieve a wider range of view angle.

Generally speaking, as the liquid crystal molecules are pushed towards different directions, a certain level of disclination D1 will occur to the bump 141 and the slit 121. The disclination D1 has low transmittance. Therefore, during the manufacturing process of the LCD panel 100, the position of the disclination D1 must be well controlled, lest the display quality be severely affected.

Figure 1B:
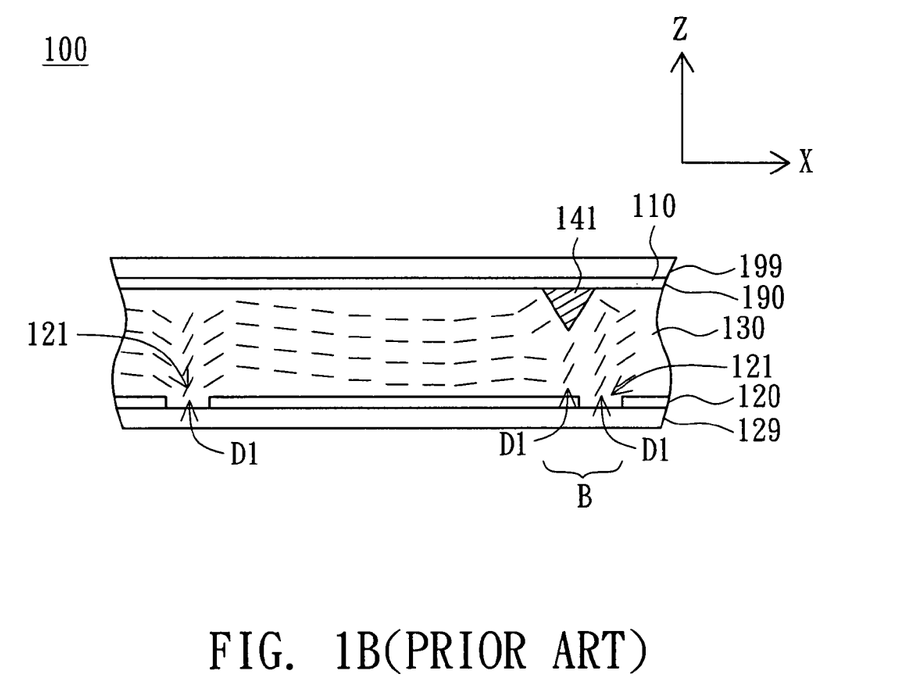
FIG. 1B (Prior Art) illustrates two non-aligned substrates of FIG. 1A.

However, when assembling the substrate 199 and the substrate 129, the bump 141 and the slit 121 must be aligned precisely. Referring to FIG. 1B, an illustration of two non-aligned substrates 199 and 129 of FIG. 1A is shown. When assembling the substrate 199 and the substrate 129, a tiny discrepancy might enlarge the disclination D1 or increase the number of disclinations D1. As indicated in FIG. 1B, as the substrate 199 and the substrate 129 are not precisely aligned, the disclination D1 of the bump 141 and the disclination D1 of the slit 121 are overlapped within a block B. The block B has low transmittance, and if the area of the block B is too large, the display quality will be severely affected.

Besides, the conventional LCD panel 100, the bump 141 and the slit 121 are symmetrically disposed in a pixel 110 as showing in FIG. 1A. However, in a large-sized pixel 110, when the liquid crystal molecules are driven to move, until all the liquid crystal molecules in the pixel 110 are deflected to a predetermined position so as to display a complete frame. As a result, the response rate of the LCD panel 100 is slowed down. In order to maintain the response rate at a certain level, the driving voltage must be boosted, not only consuming more power but also shortening the lifespan of the LCD panel 100.

Therefore, how to provide an LCD panel capable of resolving the above problems has become a focus of research and development in the LCD panel industry.

SUMMARY OF THE INVENTION

The invention is directed to a liquid crystal display (LCD) panel. The pixel electrode layer has a plurality of slits, and a plurality of liquid crystal domain arranging layers disposed near the pixel electrode layer to form a plurality of liquid crystal domain fields, such that the LCD panel of the invention has the features of higher transmittance of light, faster response rate, and more flexible range of view angle.

According to a first aspect of the present invention, an LCD panel including a plurality of pixels is provided. Each pixel includes a pixel electrode layer and a plurality of liquid crystal domain arranging layers. The pixel electrode layer has a plurality of slits. The liquid crystal domain arranging layers are disposed near the pixel electrode layer. Each pixel is divided into a plurality of essentially closed liquid crystal domain fields by the arranging layers and the slits. Each liquid crystal domain field is formed by encircling at least one arranging layer and at least one slit.

The invention will become apparent from the following detailed description of the preferred but non-limiting embodiments. The following description is made with reference to the accompanying drawings.

DETAILED DESCRIPTION OF THE INVENTION

First Embodiment

Figure 2:
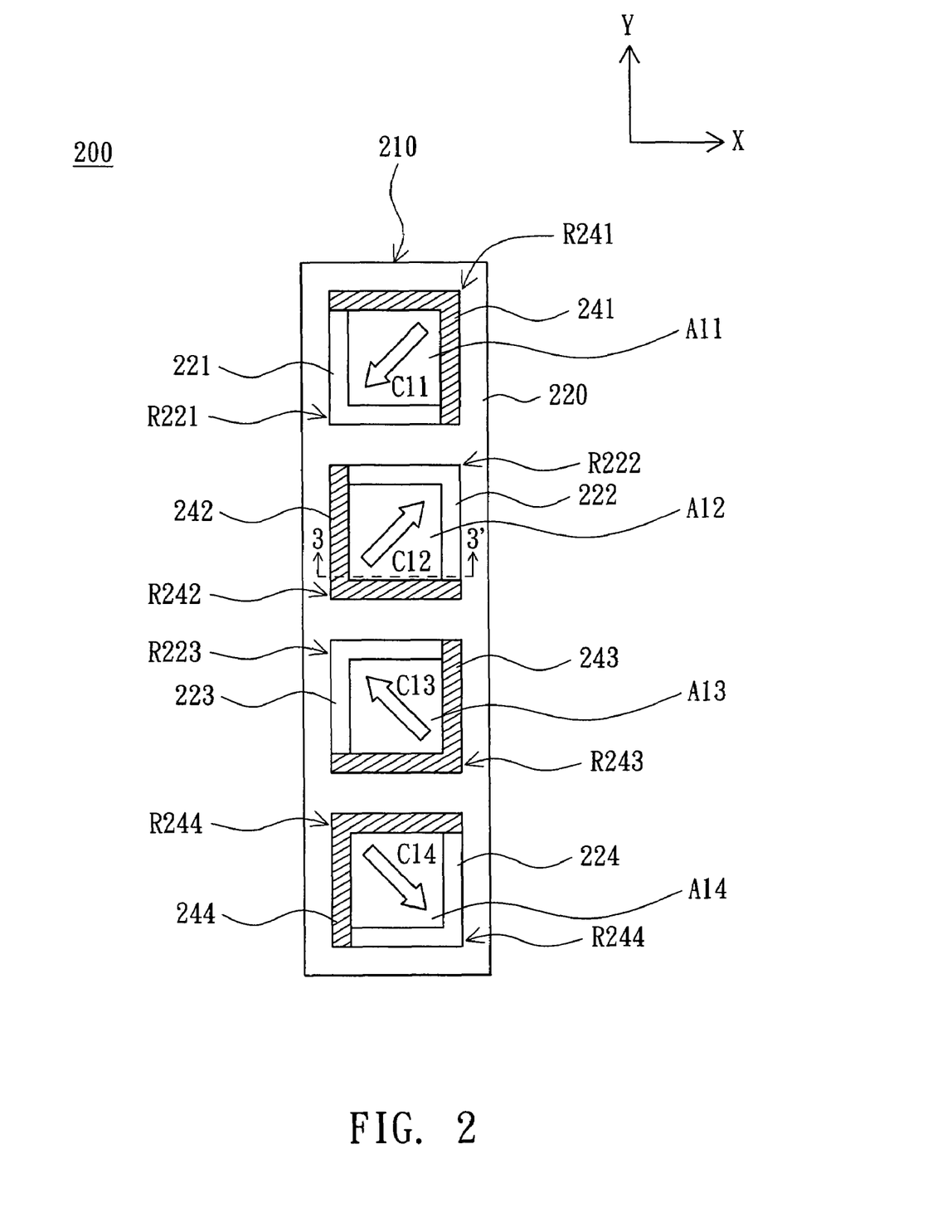
FIG. 2 is an illustration of a pixel of an LCD panel according to a first embodiment of the invention.

Referring to FIG. 2, an illustration of a pixel 210 of an LCD panel 200 according to a first embodiment of the invention is shown. The liquid crystal display (LCD) panel 200 includes a plurality of pixels 210. The structure of one of the pixels 210 is exemplified in FIG. 2, wherein the pixel 210 is a minimum display unit for forming a frame. Each pixel 210 includes a pixel electrode layer 220 and a plurality of liquid crystal domain arranging layers 241~244. In the present embodiment of the invention, the liquid crystal domain arranging layers 241~244 are exemplified by bumps. The pixel electrode layer 210 has a plurality of slits 221~224. The liquid crystal domain arranging layers 241~244 are disposed on the pixel electrode layer 220. Each pixel 210 is divided into a plurality of essentially closed liquid crystal domain fields A11~A14 by the liquid crystal domain arranging layers 241~244 and the slits 221~224. The liquid crystal domain fields A11, A12, A13, or A14 are formed by encircling at least one arranging layer 241, 242, 243, or 244 and at least one slit 221, 222, 223, or 224.

In the present embodiment of the invention, the liquid crystal domain arranging layers 241, 242, 243 and 244 are L-shaped, and so are the slits 221, 222, 223 and 224 L-shaped. The slits 221~224 and the liquid crystal domain arranging layers 241~244 are respectively paired up and encircle to form four liquid crystal domain of fields A11~A14 with rectangular cross-section. In the four liquid crystal domain fields A11~A14, the disposition of the liquid crystal domain arranging layers 241~244 and that of the slits 221~224 are not exact the same. For example, in the liquid crystal domain field A11, the liquid crystal domain arranging layer 241 is disposed at the upper right corner of the liquid crystal domain field A11, and the slit 221 is disposed at the lower left corner of the liquid crystal domain field A11; in the liquid crystal domain field A12, the liquid crystal domain arranging layer 242 is disposed at the lower left corner of the liquid crystal domain field A12, and the slit 222 is disposed at the upper right corner of the liquid crystal domain field A12.

Figure 3:
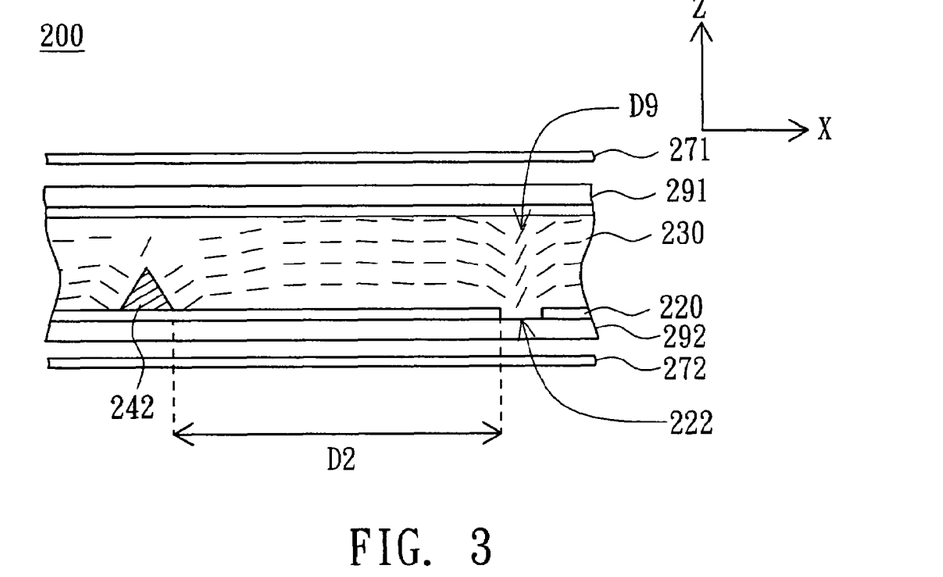
FIG. 3 is a cross-sectional view of the pixel of FIG. 2 along the cross-sectional line 3-3'.

Referring to FIG. 3, a cross-sectional view of the pixel 210 of FIG. 2 along the cross-sectional line 3-3' is shown. In the present embodiment of the invention, the liquid crystal domain arranging layer 242 is disposed on the pixel electrode layer 220. The pixel electrode layer 220 is disposed on a substrate 292. The LCD panel 200 further includes a liquid crystal layer 230 disposed on the pixel electrode layer 220, wherein the substrate 291 and the substrate 292 retain the liquid crystal layer 230 by the top surface and the bottom surface thereof In the present embodiment of the invention, the liquid crystal layer 230 is a negative dielectric anisotropy liquid crystal. The liquid crystal domain arranging layer 242 and the slit 222 are disposed on the substrate 292 and all are at the same side of the liquid crystal layer 230. Furthermore, the liquid crystal domain arranging layers 241, 243 and 244 are also disposed on the pixel electrode layer 220; the liquid crystal domain arranging layers 241, 243, and 244 as well as the slits 221, 223 and 224 are all disposed on the same side of the liquid crystal layer 230 (not illustrated in FIG. 3).

As indicated in FIG. 3, the liquid crystal domain arranging layer 242 is directly formed on the pixel electrode layer 220, and the slit 222 is formed by penetrating through the pixel electrode layer 220. A predetermined distance D2 exists between the liquid crystal domain arranging layer 242 and the slit 222. When the liquid crystal domain arranging layer 242 and the slit 222 are formed on the pixel electrode layer 220, the predetermined distance D2 is precisely arranged within the pixel 210. Therefore, no matter whether the substrate 291 and the substrate 292 are assembled precisely or not, the liquid crystal domain arranging layer 242 and the slit 222 still achieve liquid crystal alignment.

Similarly, the liquid crystal domain arranging layers 241, 243, 244 and the slits 221, 223, 224 can also be precisely arranged within the pixel 210 to achieve liquid crystal alignment.

As indicated in FIG. 2, in the liquid crystal domain field A11, the liquid crystal domain C11 is directed towards the corner R221 of the slit 221 from the corner R241 of the liquid crystal domain arranging layer 241. Similarly, in the liquid crystal domain fields A12~A14, the liquid crystal domains C12~C14 are respectively directed towards the corners R222~R224 of the slit 222~224 from the corners R242~R244 of the liquid crystal domain arranging layer 242~244. Thus, in the LCD panel 200, the liquid crystal molecules are aligned along the liquid crystal domains C11~C14 respectively directed in four different directions so as to form a multi-domain vertical alignment (MVA) LCD panel.

The liquid crystal domains C11~C14 of the liquid crystal domain fields A1~A14 differ with one other by 90° or 180°. For example, the liquid crystal domain C11 differs with the liquid crystal domain C12 by 180°; the liquid crystal domain C12 differs with the liquid crystal domain C13 by 90°.

As indicated in FIG. 3, the liquid crystal domain arranging layer 242 and the slit 222 are all disposed on the same side of the liquid crystal layer 230, but the liquid crystal domain arranging layer 242 and the slit 222 have different alignment abilities and different directions with respect to the liquid crystal molecules. However, the liquid crystal domain arranging layer 242 uses boundary energy alignment, hence having higher alignment ability than the slit 222 has. During the process of driving the liquid crystal molecules to move, the liquid crystal domain arranging layer 242 has higher alignment ability and larger pushing effect among the liquid crystal molecules, so the disclination D9 is centered near the slit 222. As a result, the impact of disclination on the transmittance of the light is reduced to a minimum and a liquid crystal domain C12 is formed. As the liquid crystal domain arranging layer 242 and the slit 222 are positioned via the photolithography process, the positioning precision is high enough to effectively control the position and the scope of the disclination D9. The formation of the liquid crystal domains C11~C14 by the liquid crystal domain arranging layers 241~244 and the slits 221~224 is disclosed below in FIGS. 4A and 4B.

Figure 4A:
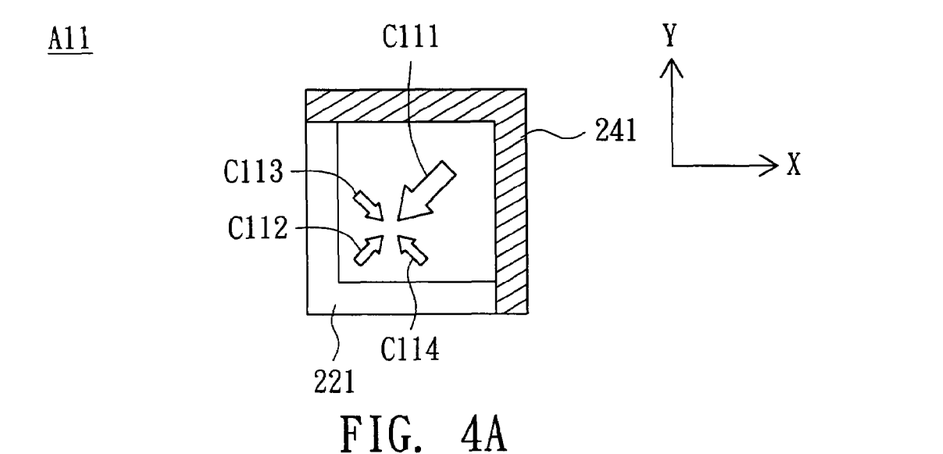
FIG. 4A and FIG. 4B illustrate the formation of a liquid crystal domain of the liquid crystal domain of field A11 of FIG. 2.
Figure 4B:
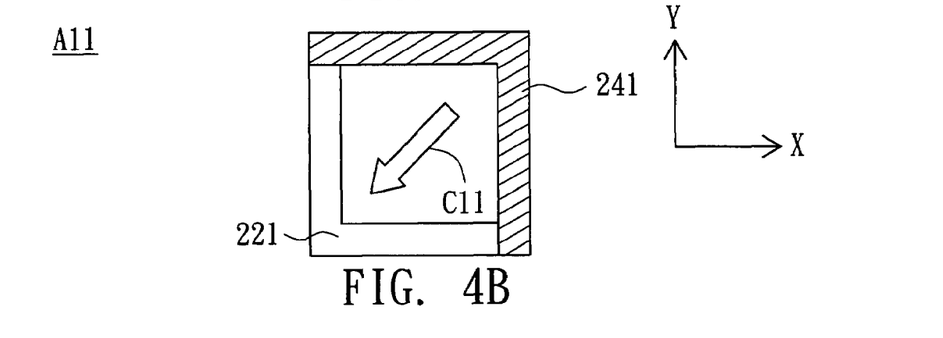

Referring to FIGS. 4A and 4B, the formation of the liquid crystal domain C11 of the liquid crystal domain of field A11 of FIG. 2 is shown. The liquid crystal domains C11~C14 are formed by pushing the liquid crystal molecules between the liquid crystal domain arranging layers 241~244 and the slits 221~224 respectively. As indicated in FIG. 4A, when a voltage is applied to drive the liquid crystal molecules to move, the liquid crystal molecules are pushed towards the center of the liquid crystal domain field A11 from the four sides thereof in the directions C111, C112, C113, and C114. Next, as indicated in FIG. 4B, the alignment ability of the liquid crystal domain arranging layer 241 is higher than that of the slit 221, so the liquid crystal molecules receives the largest pushing force in the direction C111. As a result, the liquid crystal molecules are pushed and aligned along the direction of the liquid crystal domain C11. Similarly, the liquid crystal domains C12~C14 are also formed in the same manner.

Furthermore, the liquid crystal domain fields A11~A14, respectively having the liquid crystal domains C11~C14, are integrated to form four liquid crystal domains C11~C14 of the pixel 210. In the small-sized liquid crystal domain fields A11~A14, when the liquid crystal molecules are driven to move, the waiting time for the liquid crystal molecules within the liquid crystal domain fields A11~A14 to be deflected to a predetermined position is shorter than the time required for the liquid crystal molecules to be deflected to a predetermined position when a single pixel 210 is treated as a liquid crystal domain field. Thus, the response rate for the LCD panel 200 to display a frame is instant and fast.

As the width, the height and the shape of the liquid crystal domain arranging layers 241~244 as well as the width and the length of the slits 221~224 may vary, the liquid crystal domain arranging layers 241~244 and the slits 221~224 will have different alignment abilities. The difference in alignment ability further affects the liquid crystal domains C11~C14. The structures of the liquid crystal domain arranging layers 241~244 and that of the slits 221~224 may be adapted to fit different needs to obtain a desired liquid crystal domain.

Preferably, the liquid crystal layer 230 further includes at least a chiral dopant for facilitating the rotation of the liquid crystal molecules and increasing the transmittance of the light.

As indicated in FIG. 3, the LCD panel 200 preferably includes two polarizers 271 and 272. The polarizer 271 is disposed above the substrate 291, and the polarizer 272 is disposed under the substrate 292, wherein the polarizers 271 and 272 are circular polarizers or linear polarizers. The circular polarization system or the linear polarization system formed by the polarizers 271 and 272 is incorporated with the liquid crystal domains formed by the liquid crystal domain fields to increase the transmittance of the light.

According to the above embodiment, despite the pixels of the LCD panel of the invention are exemplified by four liquid crystal domain fields, the number of the liquid crystal domain fields of the invention can be two, three, eight, multiples of four, or any number that fits actual needs. The number of liquid crystal domain fields is not for limiting the scope of technology of the invention. Any designs where the pixel electrode layer has a plurality of slits and a plurality of liquid crystal domain arranging layers are disposed near the pixel electrode layer to form a plurality of liquid crystal domain fields are within the scope of technology of the invention.

Figure 5A:
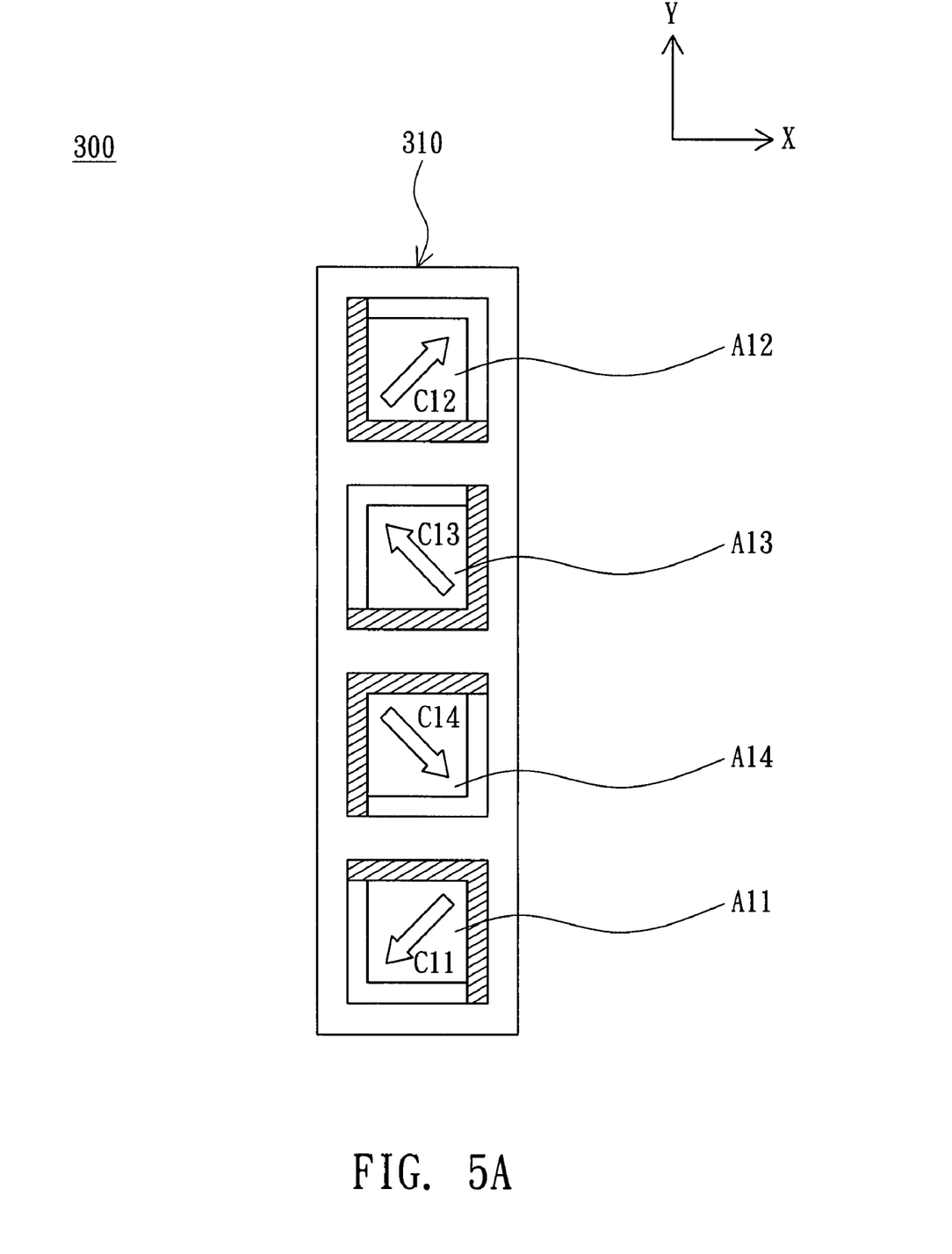
FIGS. 5A~5C are illustrations of another LCD panel.
Figure 5B:
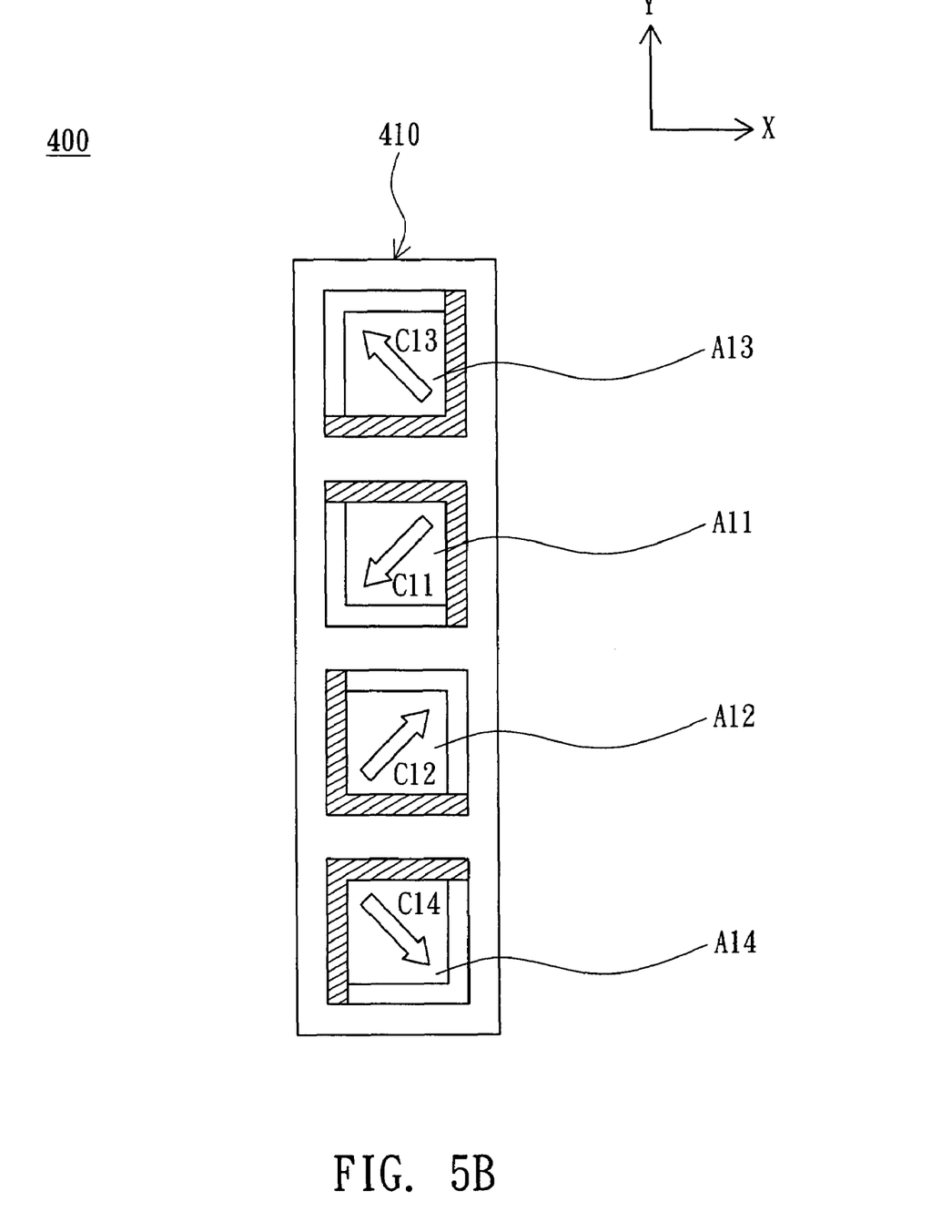
Figure 5C:
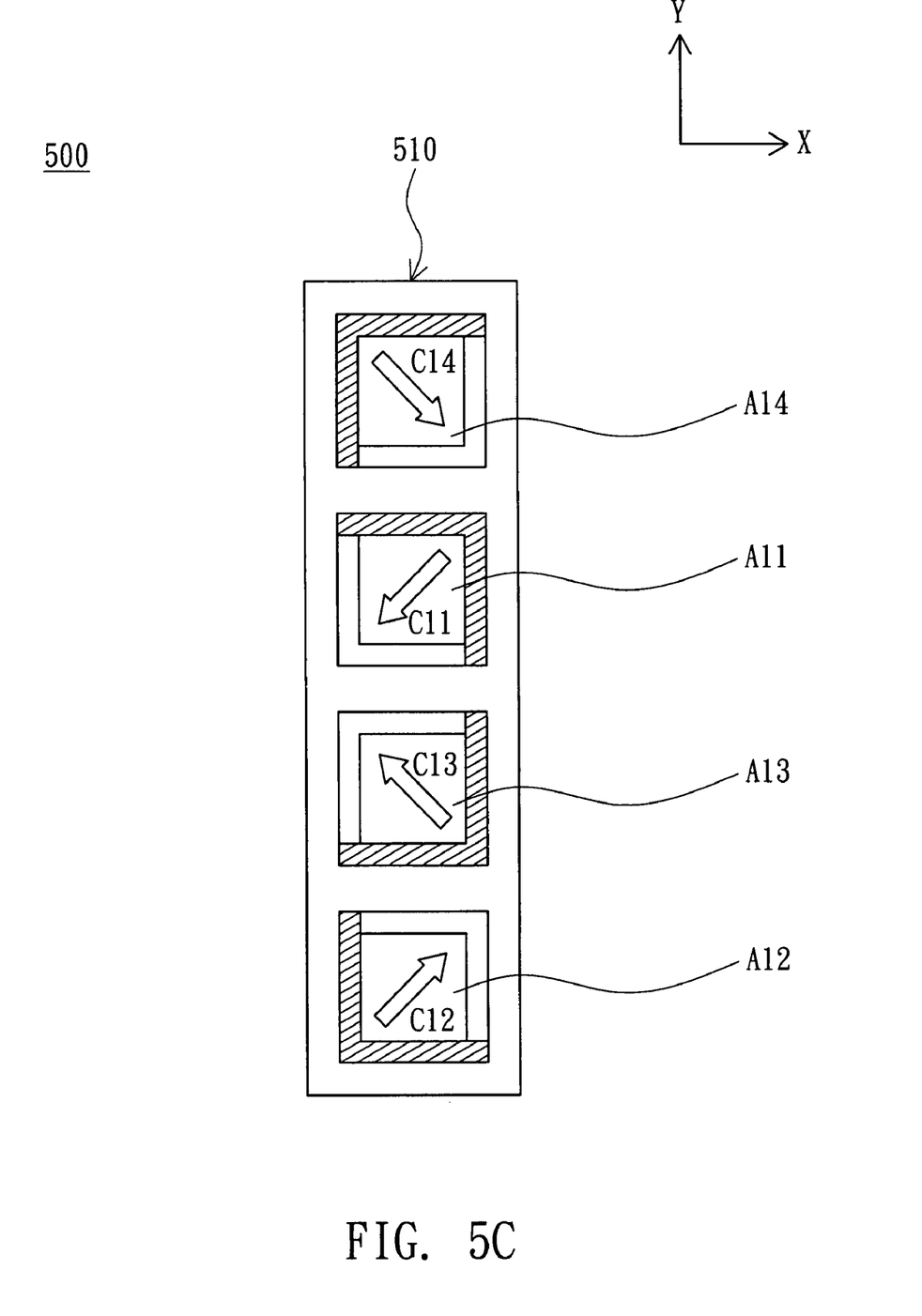

According to the above embodiment, the pixel 210 of the LCD panel 200 of the present embodiment of the invention are sequentially formed top down by the liquid crystal domain fields A11, A12, A13 and A14. However, the arrangements of the liquid crystal domain fields A1~A14 are not for limiting the technology of the invention. Referring to FIGS. 5A~5C, illustrations of LCD panel 300~500 are shown. According to other methods of arrangement, the liquid crystal domain fields A1~A14 can respectively form the pixels 310, 410, and 510 of the LCD panels 300, 400, and 500.

According to the above embodiment, the liquid crystal domain arranging layers 241~244 of the LCD panel of the invention are exemplified by the bumps disposed on the pixel electrode layer 220. However, the liquid crystal domain arranging layers of the invention can be exemplified by common electrode. Any design where the pixel electrode layer has a plurality of slits and a plurality of liquid crystal domain arranging layers are disposed near the pixel electrode layer such that a plurality of liquid crystal domain fields are formed are within the scope of technology of the invention. In the second embodiment stated below, the liquid crystal domain arranging layers are exemplified by common electrode, and different dispositions of the liquid crystal domain arranging layers and the slits are provided.

Second Embodiment

Figure 6:
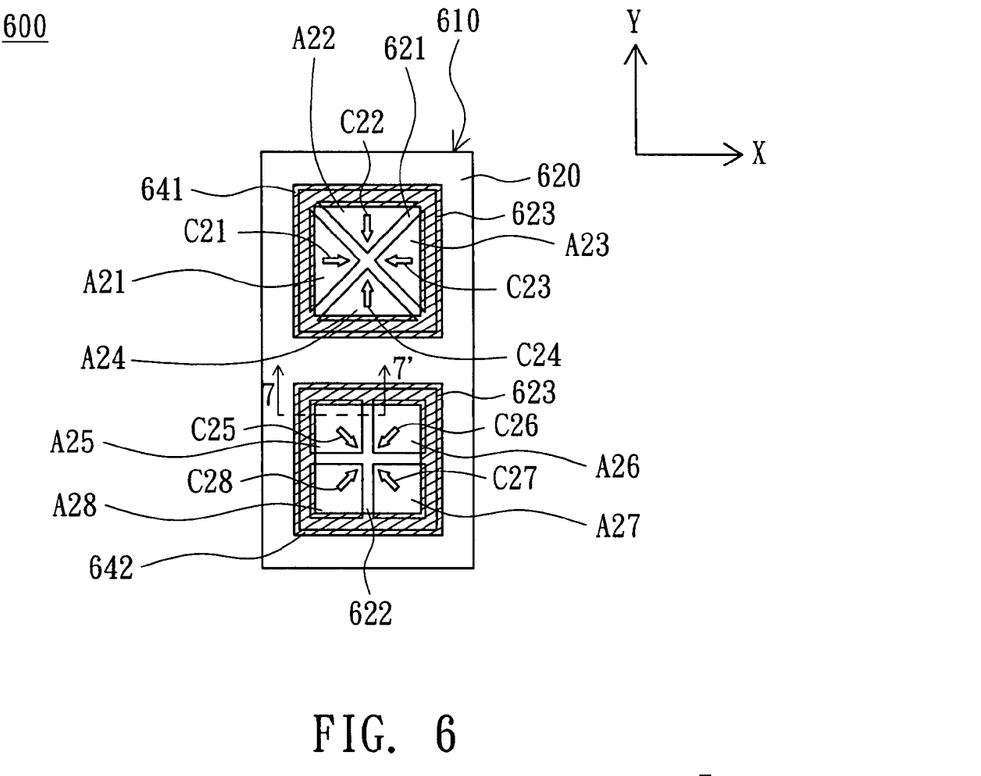
FIG. 6 is an illustration of a pixel of LCD panel according to a second embodiment of the invention.

The LCD panel 600 of the present embodiment of the invention differs with the LCD panel 200 of the first embodiment in the structures of the liquid crystal domain arranging layers and the slits. Other similarities between the two embodiments are not repeated here. Referring to FIG. 6, an illustration of a pixel 610 of LCD panel 600 according to a second embodiment of the invention is shown. The pixel electrode layer 620 has a first crossed slit pair 621 and a second crossed slit 622. The liquid crystal domain arranging layer of the present embodiment of the invention includes a first rectangular liquid crystal domain arranging layer 641 and a second rectangular liquid crystal domain arranging layer 642. in the pixel electrode layer 620, a circular slit 623 is disposed with respect to the first rectangular liquid crystal domain arranging layer 641 and the second rectangular liquid crystal domain arranging layer 642 respectively. The first rectangular liquid crystal domain arranging layer 641 encircles the first crossed slit pair 621, and the second rectangular liquid crystal domain arranging layer 642 encircles the second crossed slit pair 622. In the present embodiment of the invention, both the first rectangular liquid crystal domain arranging layer 641 and the second rectangular liquid crystal domain arranging layer 642 are a common electrode (illustrated in FIG. 7). The four ends of the first crossed 621 are disposed at the four corners of the first rectangular liquid crystal domain arranging layer 641, and the four ends of the second crossed slit pair 622 are disposed at the respective middles of the four sides of the second rectangular liquid crystal domain arranging layer 642.

As indicated in FIG. 6, the first crossed slit pair 621 and the first rectangular liquid crystal domain arranging layer 641 form four first liquid crystal domain fields A2l~A24. The first liquid crystal domain fields A21~A24 each has a triangular cross-section. The liquid crystal domains C21~C24 of the first liquid crystal domain fields A21~A24 are respectively directed towards the center of the first crossed slit pair 621 from the respective middles of the four sides of the first rectangular liquid crystal domain arranging layer 641.

The second crossed slit pair 622 and the second rectangular liquid crystal domain arranging layer 642 also form the second four liquid crystal domain fields A25~A28. The second liquid crystal domain fields A25~A28 each has a rectangular cross-section. The liquid crystal domains C25~C28 of the second liquid crystal domain fields A25~A28 are directed towards the center of the second slit crossed slit pair 622 from the four corners of the second rectangular liquid crystal domain arranging layer 642.

Furthermore, the pixel 610 forms eight liquid crystal domain fields A21~A28 by the first rectangular liquid crystal domain arranging layer 641, the second rectangular liquid crystal domain arranging layer 642, the first slit crossed slit pair 621 and the second crossed slit air 622. The liquid crystal domains C21~C28 of the liquid crystal domain fields A21~A28 are not the same. The liquid crystal domains C2~C28 of the liquid crystal domain fields A21~A28 differ with each other by 45°, 90° or 180°. For example, the liquid crystal domain C21 differs with the liquid crystal domain C22 by 90°, the liquid crystal domain C22 differs with the liquid crystal domain C26 by 45°, and the liquid crystal domain C26 differs with the liquid crystal domain C28 by 180°. Thus, the LCD panel 600 achieves a wider range of view angle by eight different liquid crystal domains C21~C28.

Figure 7:
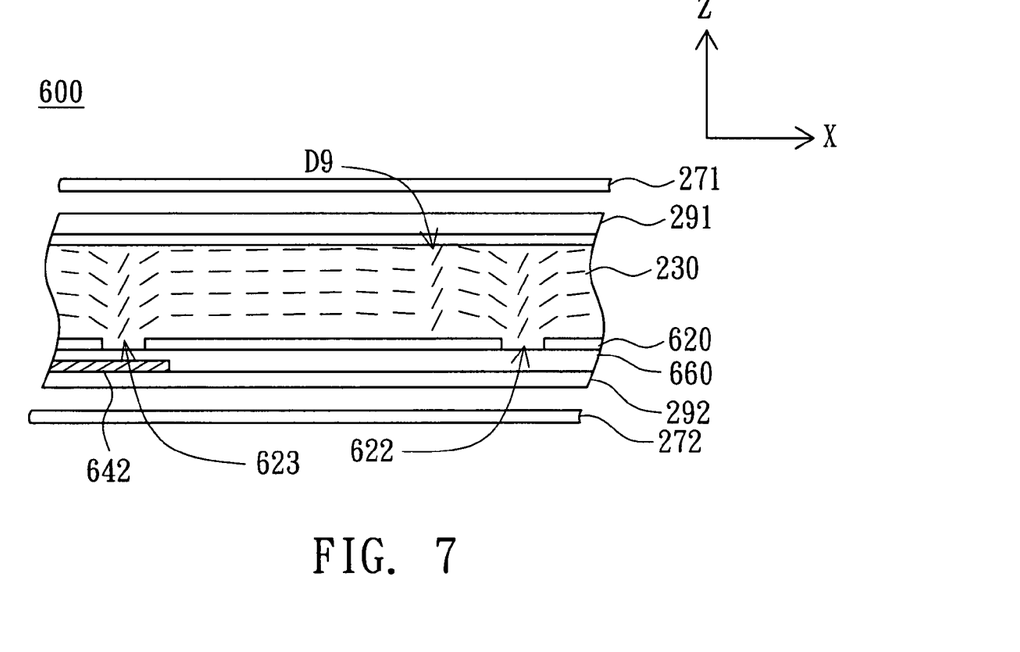
FIG. 7 is a cross-sectional view of the pixel of FIG. 6 along the cross-sectional line 7-7'.

Referring to FIG. 7, a cross-sectional view of the pixel 610 of FIG. 6 along the cross-sectional line 7-7' is shown. In the present embodiment of the invention, both the first rectangular liquid crystal domain arranging layer 641 and the second rectangular liquid crystal domain arranging layer 642 are a common electrode. The common electrode and the pixel electrode layer 620 are disposed on the substrate 292, and the common electrode and the pixel electrode layer 620 are separated by an insulating layer 660. The common electrode can be partially overlapped with the pixel electrode layer 620.

Despite the first rectangular liquid crystal domain arranging layer 641 and the second rectangular liquid crystal domain arranging layer 642 of the present embodiment of the invention are respectively exemplified by a common electrode, both the first rectangular liquid crystal domain arranging layer 641 and the second rectangular liquid crystal domain arranging layer 642 are exemplified by a bump disposed on the pixel electrode layer 620. Any designs where the pixel electrode layer has a plurality of slits and a plurality of liquid crystal domain arranging layers are disposed near the pixel electrode layer such that a plurality of liquid crystal domain fields are formed are within the scope of technology of the invention.

Figure 8A:
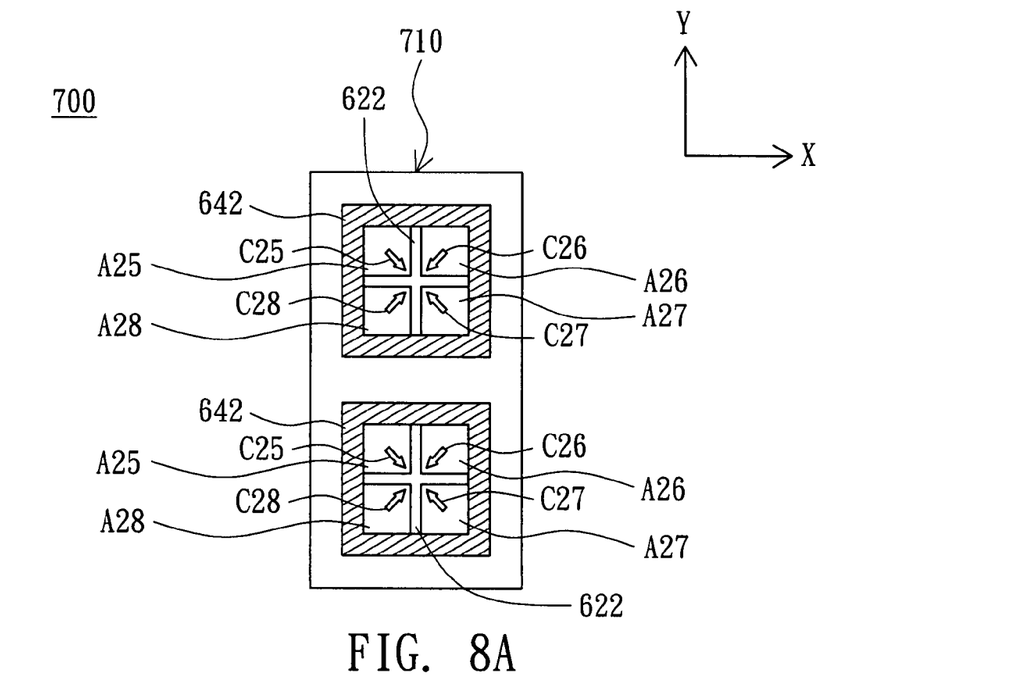
FIGS. 8A~8B are illustrations of another LCD panel.
Figure 8B:
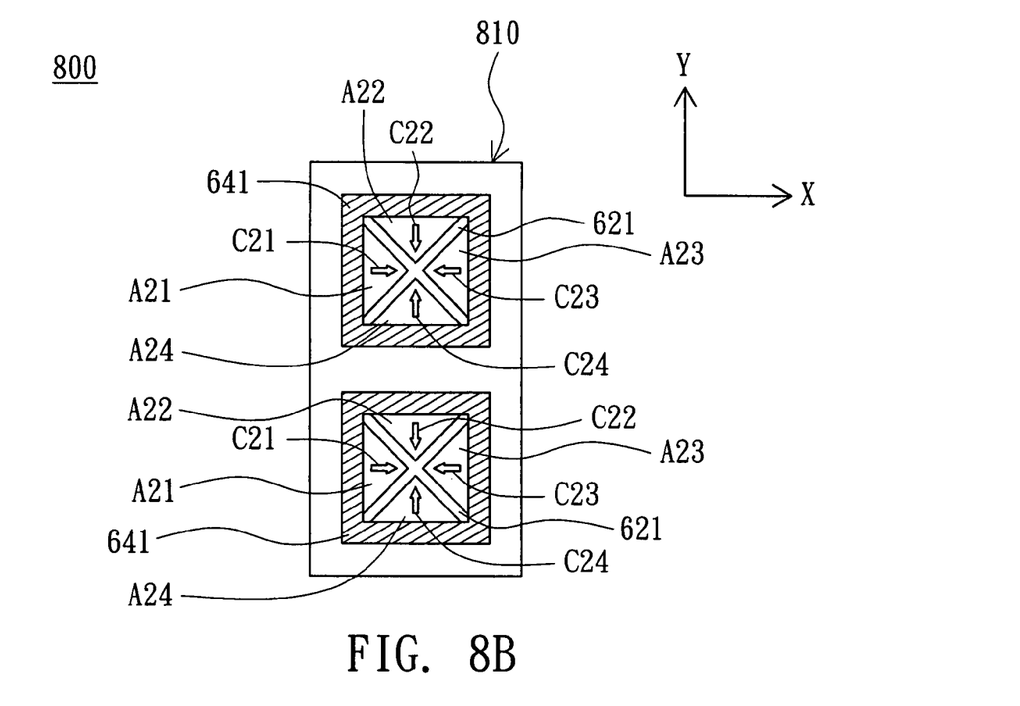

According to the above embodiment, the pixel 610 of the LCD panel 600 of the present embodiment of the invention, the first rectangular liquid crystal domain arranging layer 641, the second rectangular liquid crystal domain arranging layer 642, the first crossed slit pair 621 and the second crossed slit pair 622 are elaborated by the formation of four first liquid crystal domain fields A21~A24 and four second liquid crystal domain fields A25~A28. However, the arrangements of the first rectangular liquid crystal domain arranging layer 641, the second rectangular liquid crystal domain arranging layer 642, the first crossed slit pair 621 and the second crossed slit pair 622 are not for limiting the technology of the invention. Referring to FIGS. 8A~8B, illustrations of LCD panels 700 and 800 are shown. As indicated in FIG. 8A, in the pixel 710 of the LCD panel 700, two second rectangular liquid crystal domain arranging layers 642 and two second crossed slit pairs 622 respectively form two groups of second liquid crystal domain fields A25~A28. As indicated in FIG. 8B, in the pixel 810 of the LCD panel 800, two first rectangular liquid crystal domain arranging layers 641 and two first crossed slit pairs 621 respectively form two groups of first liquid crystal domain fields A21~A24.

According to the LCD panel disclosed in the above embodiments of the invention, the pixel electrode layer has a plurality of slits and a plurality of liquid crystal domain arranging layers are disposed near the pixel electrode layer to form a plurality of liquid crystal domain fields. The advantages and features of the LCD panel of the invention are stated below.

Firstly, the transmittance of the light is increased. In the LCD panel of the invention, the liquid crystal domain arranging layer of each liquid crystal domain field has higher alignment ability and larger pushing effect among the liquid crystal molecules, so that disclination is centered near the slit, and the position of disclination can be precisely controlled. Thus, the light transmittance of the LCD panel of the invention can be precisely controlled and increased.

Secondly, the response rate is increased. In a small-sized liquid crystal domain of field, when the liquid crystal molecules are driven to move, the waiting time for the liquid crystal molecules within the liquid crystal domain fields to be deflected to a predetermined position is shorter than the time required for the liquid crystal molecules to be deflected to a predetermined position when a single pixel is treated as a liquid crystal domain field. Thus, the response rate for the LCD panel to display a frame is instant and fast.

Thirdly, the range of view angle is more flexible. The liquid crystal domain fields have different liquid crystal domains, and the liquid crystal domain fields are arranged according to the features of the product, hence forming an MVA LCD panel. Thus, the design of the range of view angle of the LCD panel is more flexible.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) panel, comprising:
   a plurality of pixels, each pixel comprising:
      a pixel electrode layer having a plurality of slits; and
      a plurality of liquid crystal domain arranging layers disposed near the pixel electrode layer;
   wherein each pixel is divided into a plurality of essentially closed liquid crystal domain fields by the liquid crystal domain arranging layers and the slits, and each liquid crystal domain field is formed by encircling at least one arranging layer and at least one slit, the number of liquid crystal domain fields of each pixel is a multiple of four, the slits have a first crossed slit pair and a second crossed slit pair, the liquid crystal domain arranging layers include a first rectangular liquid crystal domain arranging layer encircling the first crossed slit pair and a second rectangular liquid crystal domain arranging layer encircling the second crossed slit pair, the four ends of the first crossed slit pair are disposed at the four corners of the first rectangular liquid crystal domain arranging layer, and the four ends of the second crossed slit pair are disposed at the respective middles of the four sides of the second rectangular liquid crystal domain arranging layer.

2. The LCD panel according to claim 1, wherein each of the liquid crystal domain arranging layers is a bump, and the liquid crystal domain arranging layer is disposed on the pixel electrode layer.

3. The LCD panel according to claim 1, wherein each of the liquid crystal domain arranging layers is a common electrode separated from the pixel electrode layer by an insulating layer.

4. The LCD panel according to claim 3, wherein the common electrode is partially overlapped with the pixel electrode layer.

5. The LCD panel according to claim 1, wherein each liquid crystal domain field has a rectangular cross-section or a triangular cross-section.

6. The LCD panel according to claim 1, wherein the first crossed slit pair and the first rectangular liquid crystal domain arranging layer form the first four liquid crystal domain fields, the liquid crystal domains of the first liquid crystal domain fields are respectively directed towards the center of the first crossed slit pair from the respective middles of the four sides of the first rectangular liquid crystal domain arranging layer, the second crossed slit pair and the second rectangular liquid crystal domain arranging layer also form the second four liquid crystal domain fields, the liquid crystal domains of the second liquid crystal domain fields are respectively directed towards the center of the second crossed slit pair from the four corners of the second rectangular liquid crystal domain arranging layer.

7. The LCD panel according to claim 6, wherein the liquid crystal domains of the liquid crystal domain fields differ with each other by 45°, 90° or 180°.

8. The LCD panel according to claim 1, wherein the LCD panel further comprises a liquid crystal layer disposed on the pixel electrode layer, and the liquid crystal layer is a negative dielectric anisotropy liquid crystal layer.

9. The LCD panel according to claim 8, wherein the liquid crystal layer further comprises at least a chiral dopant.

10. The LCD panel according to claim 1, further comprising:
   a liquid crystal layer, with a polarizer disposed on the top surface and a polarizer disposed on the bottom surface of the liquid crystal layer, wherein the polarizers are circular polarizers or linear polarizers.

11. The LCD panel according to claim 1, wherein the LCD panel is a multi-domain vertical alignment (MVA) LCD panel.

* * * * *